United States Patent [19]

Leatherman

[11] Patent Number: 5,782,284
[45] Date of Patent: Jul. 21, 1998

[54] SUN SHADE SYSTEM FOR WINDSHIELDS

[76] Inventor: Benny L. Leatherman, 1305 Southwind Ct., Concord, N.C. 28025

[21] Appl. No.: 855,010

[22] Filed: May 13, 1997

[51] Int. Cl.⁶ ..................................................... B60J 3/02
[52] U.S. Cl. ..................... 160/370.22; 160/120; 160/903
[58] Field of Search .......................... 160/370.22, 23.1, 160/24, 25, 120, 290.1, 903, DIG. 2, DIG. 3; 296/95.1, 97.1, 97.7, 97.8, 97.9, 141, 142, 143; 248/266, 269, 271

[56] References Cited

U.S. PATENT DOCUMENTS

| | | | |
|---|---|---|---|
| Re. 15,904 | 8/1924 | Hein | 160/370.22 X |
| 3,410,601 | 11/1968 | Thompson | 160/370.22 X |
| 4,442,881 | 4/1984 | Monteath et al. | 160/370.22 X |
| 4,736,980 | 4/1988 | Eubanks | 160/370.22 X |
| 4,874,026 | 10/1989 | Worrall | 160/370.22 X |
| 4,921,299 | 5/1990 | Herrick | 160/370.22 X |
| 5,137,072 | 8/1992 | Traspadini | 160/370.22 X |
| 5,344,206 | 9/1994 | Middleton | 160/370.22 X |
| 5,503,212 | 4/1996 | Lin | 160/370.22 |
| 5,564,770 | 10/1996 | Smith et al. | 160/370.22 X |
| 5,575,524 | 11/1996 | Cronk | 160/370.22 X |
| 5,615,924 | 4/1997 | Owen | 160/370.22 X |

Primary Examiner—David M. Purol

[57] ABSTRACT

A new sun shade system for windshields for shielding the interiors of vehicles from sunlight. The inventive device includes a pair of sunshade assemblies disposed adjacent each end of the windshield. Each assembly includes a housing which is mounted to a roof support member of the vehicle. A sunscreen support roll is supported within each housing and a sunscreen is attached to each roll. The sunscreens include rods attached to their edges with a handle connected to each rod. The handles are connected together so that the sunscreens are secured in position over the windshield. The sunscreens are sized so that each sunscreen covers about one-half of the windshield. A semi-circular recess is formed in each of the rods in order to accommodate the support post of a rear view mirror. Supplemental attachments are secured to the windshield at the center of the top and bottom edges thereof, and are adapted to engage with the rods for providing additional securement of the sunscreens.

15 Claims, 4 Drawing Sheets

SUN SHADE SYSTEM FOR WINDSHIELDS

BACKGROUND OF THE INVENTION

1. Field of the Invention

The present invention relates to automobile shades and more particularly pertains to a new sun shade system for a windshield that shields the interior of a vehicle from sunlight.

2. Description of the Prior Art

The use of automobile shades is known in the prior art. More specifically, automobile shades heretofore devised and utilized are known to consist basically of familiar, expected and obvious structural configurations, notwithstanding the myriad of designs encompassed by the crowded prior art which have been developed for the fulfillment of countless objectives and requirements.

Known prior art automobile shades include U.S. Pat. No. 5,344,206; U.S. Pat. No. 5,098,149; U.S. Pat. No. 5,004,285; U.S. Pat. 5,044,686; U.S. Pat. No. 5,433,499; and U.S. Pat. No. Des. 335,113.

While these devices fulfill their respective, particular objectives and requirements, the aforementioned patents do not disclose a new sun shade system for a windshield. The inventive device includes a pair of sunshade assemblies disposed adjacent each end of the windshield. Each assembly includes a housing which is mounted to a roof support member of the vehicle. A sunscreen support roll is supported within each housing and a sunscreen is attached to each roll. The sunscreens include rods attached to their edges with a handle connected to each rod. The handles are connected together so that the sunscreens are secured in position over the windshield. The sunscreens are sized so that each sunscreen covers about one-half of the windshield. A semi-circular recess is formed in each of the rods in order to accommodate the support post of a rear view mirror. Supplemental attachments are secured to the windshield at the center of the top and bottom edges thereof, and are adapted to engage with the rods for providing additional securement of the sunscreens.

In these respects, the sun shade system for a windshield according to the present invention substantially departs from the conventional concepts and designs of the prior art, and in so doing provides an apparatus primarily developed for the purpose of shielding the interiors of vehicles from sunlight.

SUMMARY OF THE INVENTION

In view of the foregoing disadvantages inherent in the known types of automobile shades now present in the prior art, the present invention provides a new sun shade system for a windshield wherein the same can be utilized for shielding the interior of a vehicle from sunlight.

The general purpose of the present invention, which will be described subsequently in greater detail, is to provide a new sun shade system for a windshield which has many of the advantages of the automobile shades mentioned heretofore and many novel features that result in a new sun shade system for a windshield which is not anticipated, rendered obvious, suggested, or even implied by any of the prior art automobile shades, either alone or in any combination thereof.

To attain this, the present invention generally comprises a pair of sunshade assemblies disposed adjacent each end of the windshield. Each assembly includes a housing which is mounted to a roof support member of the vehicle. A sunscreen support roll is supported within each housing and a sunscreen is attached to each roll. The sunscreens include rods attached to their edges with a handle connected to each rod. The handles are connected together so that the sunscreens are secured in position over the windshield. The sunscreens are sized so that each sunscreen covers about one-half of the windshield. A semi-circular recess is formed in each of the rods in order to accommodate the support post of a rear view mirror. Supplemental attachments are secured to the windshield at the center of the top and bottom edges thereof, and are adapted to engage with the rods for providing additional securement of the sunscreens.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sun shade system for a windshield which has many of the advantages of the automobile shades mentioned heretofore and many novel features that result in a new sun shade system for a windshield which is not anticipated, rendered obvious, suggested, or even implied by any of the prior art automobile shades, either alone or in any combination thereof.

It is another object of the present invention to provide a new sun shade system for a windshield which may be easily and efficiently manufactured and marketed.

It is a further object of the present invention to provide a new sun shade system for a windshield which is of a durable and reliable construction.

An even further object of the present invention is to provide a new sun shade system for a windshield which is susceptible of a low cost of manufacture with regard to both materials and labor, and which accordingly is then susceptible of low prices of sale to the consuming public, thereby making such sun shade system for a windshield economically available to the buying public.

Still yet another object of the present invention is to provide a new sun shade system for a windshield which provides in the apparatuses and methods of the prior art some of the advantages thereof, while simultaneously overcoming some of the disadvantages normally associated therewith.

Still another object of the present invention is to provide a new sun shade system for a windshield which shields the interior of a vehicle from sunlight.

Yet another object of the present invention is to provide a new sun shade system for a windshield which includes a pair of sunshade assemblies disposed adjacent each end of the windshield. Each assembly includes a housing which is mounted to a roof support member of the vehicle. A sunscreen support roll is supported within each housing and a sunscreen is attached to each roll. The sunscreens include rods attached to their edges with a handle connected to each rod. The handles are connected together so that the sunscreens are secured in position over the windshield. The sunscreens are sized so that each sunscreen covers about one-half of the windshield. A semi-circular recess is formed in each of the rods in order to accommodate the support post of a rear view mirror. Supplemental attachments are secured to the windshield at the center of the top and bottom edges thereof, and are adapted to engage with the rods for providing additional securement of the sunscreens Still yet another object of the present invention is to provide a new sun shade system for a windshield that is easy to install and operate.

Even still another object of the present invention is to provide a new sun shade system for a windshield that covers the entire windshield and is designed to accommodate the rear view mirror of the windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
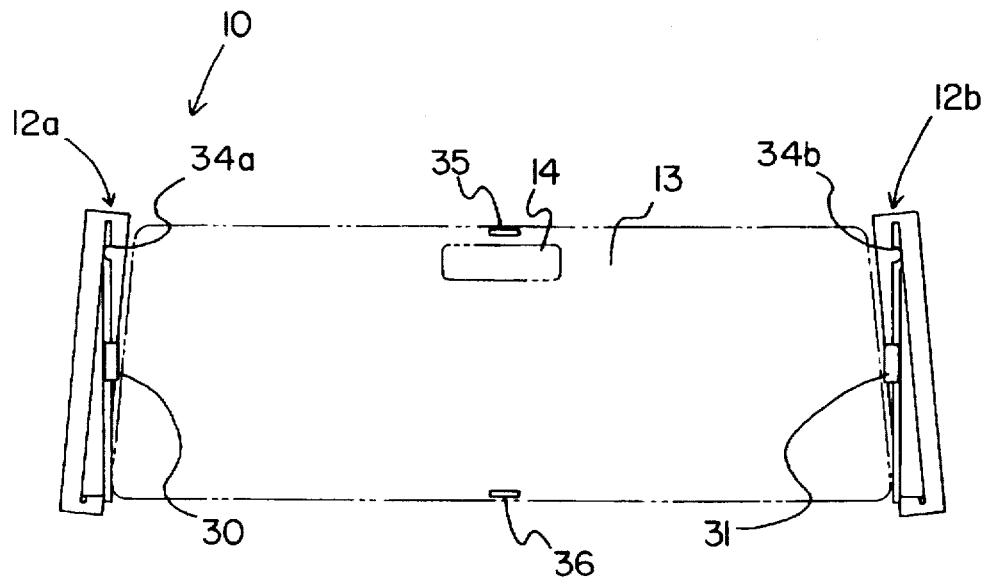
FIG. 1 is a view of the sunshade assemblies mounted on either side of a windshield with the sunscreens being retracted.

With reference now to the drawings, and in particular to FIGS. 1 through 6 thereof, a new sun shade system for a windshield embodying the principles and concepts of the present invention and generally designated by the reference numeral 10 will be described.

As best illustrated in FIGS. 1 through 6, the sun shade system for a windshield 10 comprises a pair of sunshade assemblies 12a,b disposed adjacent each end of a vehicle windshield 13 (illustrated in dashed lines). As is conventional, the windshield 13 includes a rear view mirror 14 attached thereto by a rear view mirror support post (not shown). The sunshade assemblies 12a,b are configured such that sunscreens 15a,b associated therewith are moveable between retracted positions where the windshield is uncovered, shown in FIG. 1, and extended positions where the windshield is covered, shown in FIG. 2. As shown, each sunscreen 15a,b covers approximately one-half of the windshield 13. The sunscreens 15a,b are formed of a flexible sheet material, preferably a cloth or plastic material. Furthermore, the sunscreens can include personalized messages or advertisements thereon.

Figure 5:
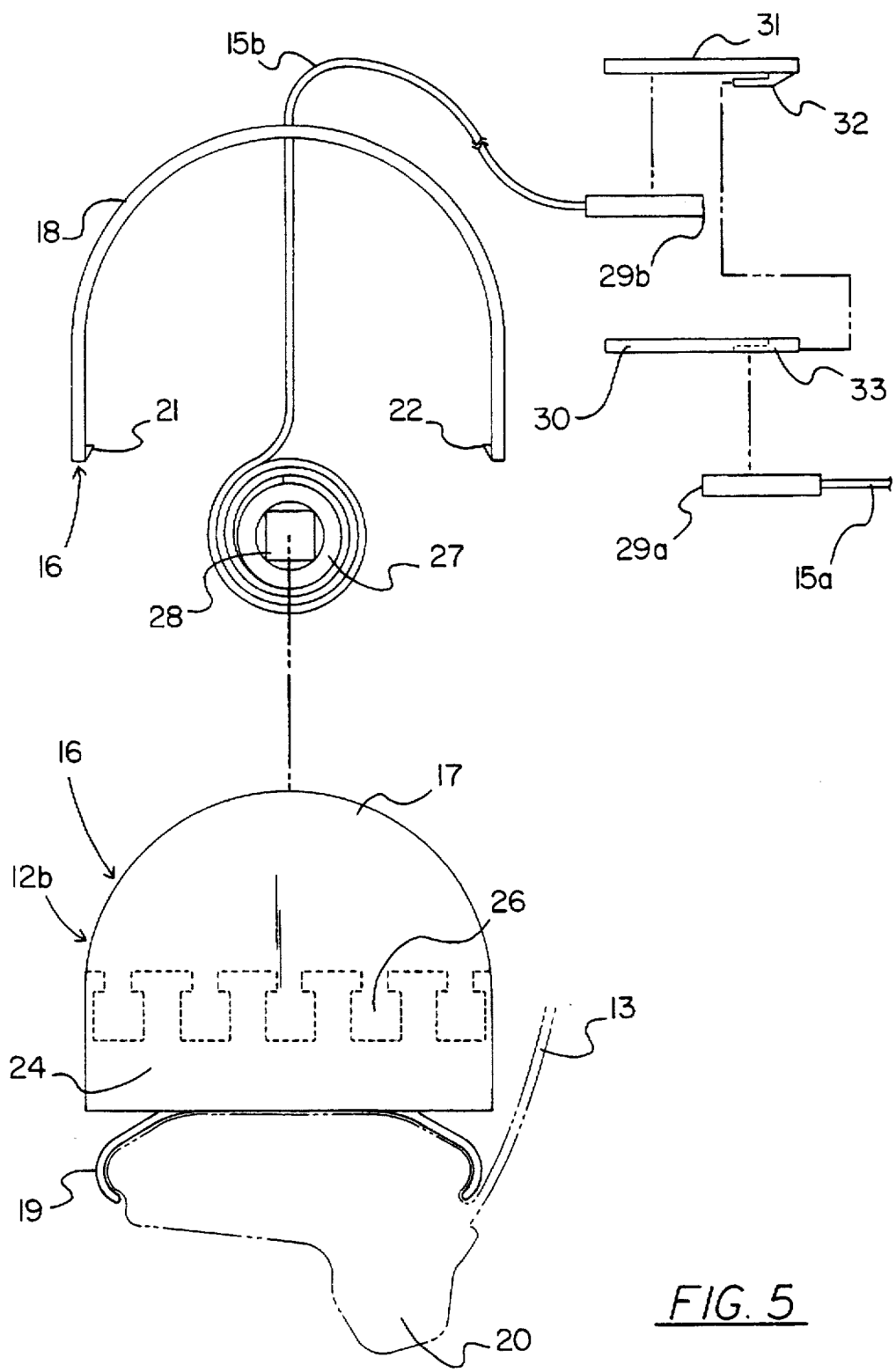
FIG. 5 is a top exploded view of one of the sunshade assemblies and the elements therein.

The sunshade assemblies 12a,b are substantially identical to each other so only one assembly 12b will be described in detail. Referring to FIG. 5, it is seen that the assembly 12b comprises a housing 16 made up of a main housing portion 17 and a housing cover portion 18 removably attached to the main housing portion. A C-shaped mounting clip 19 is attached to the back side of the main housing portion 17 so as to attach the housing 16 to a roof support member 20 of the vehicle. A single clip 19 or a plurality of longitudinally spaced clips 19 can be used to mount the housing. The clip 19 is made of a flexible metal or plastic material, so that the housing 16 can be easily attached to, and detached from, the member 20. Other mounting means in place of clip 19 could be used as well, such as screws, hook and loop fasteners, and a hook and eye screw system. Additionally, the back of the housing portion 17 can be integrally formed with a mounting structure to permit attachment of the portion 17 to the roof support member.

Figures 3, 4:
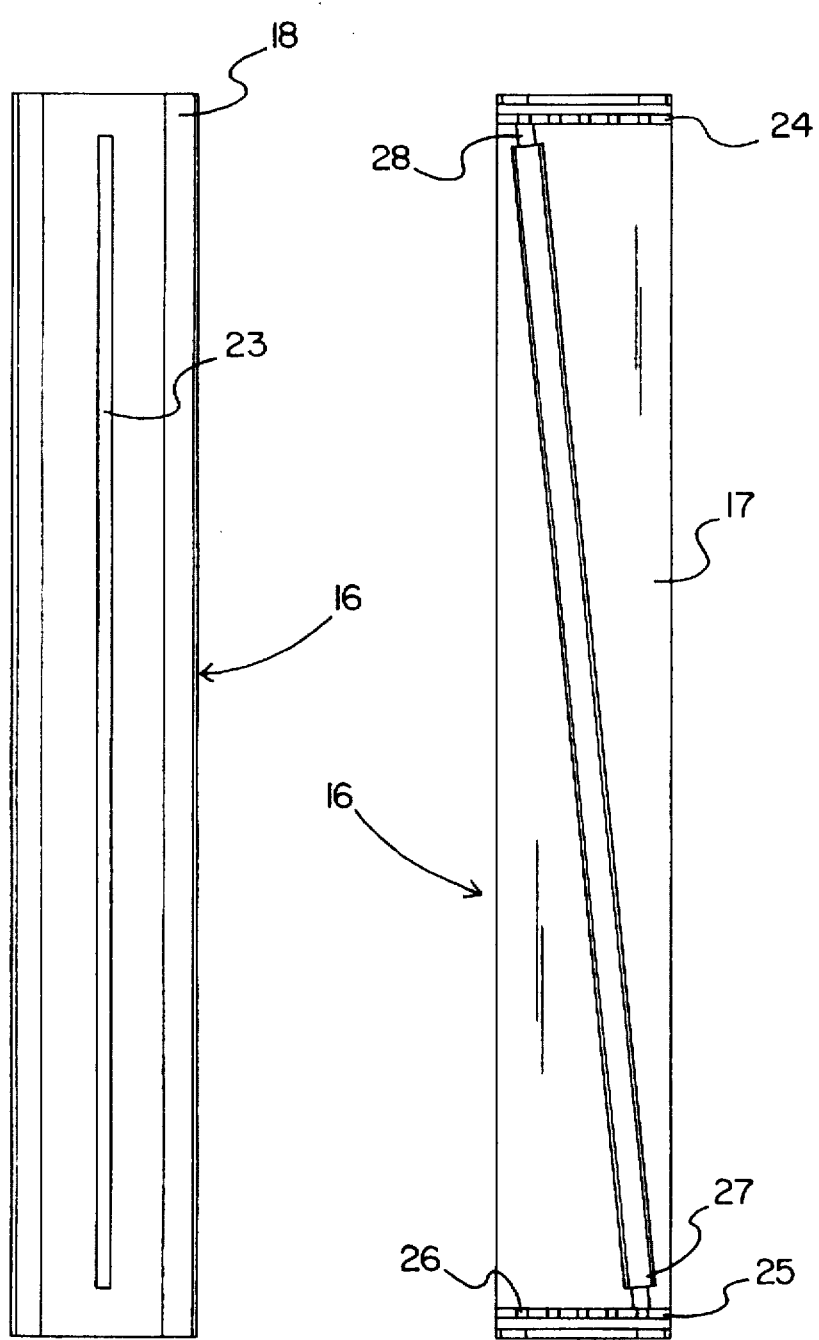
FIG. 3 is a front view of one of the housing cover portions.
FIG. 4 is a front view of the main housing portion with the housing cover portion removed.

The cover portion 18 is generally U-shaped and includes projections 21,22 at each of its ends which are used to removably secure the cover portion to the main housing portion. A slot 23 is formed along a substantial extent of the portion 18, as seen in FIG. 3, through which the sunscreen 15b passes. The main housing portion 17, on the other hand, includes a pair of mounting brackets 24,25 disposed adjacent the top and bottom ends thereof as shown in FIG. 4. Each bracket includes a plurality of spaced mounting slots 26, the purpose of which will be described below.

The sunscreen 15b is attached along one edge to a conventional support roll 27 through which extends a support shaft 28. The ends of the support shaft 28 are disposed within one of the mounting slots 26 in each bracket 24,25 so as support the roll 27 within the housing 16. As shown in FIG. 4, the roll 27 is preferably supported at an angle so as to match the slant of the windshield 13. The angle that the roll is supported at can be changed by changing the mounting slots 26 which support the ends of the shaft 28. The sunscreen 15b, support roll 27, and shaft 28 is a conventional arrangement where the sunscreen 15b is able to rolled up on the support roll 27 when in the retracted position shown in FIG. 1. A conventional biasing and retraction mechanism, not shown, which is commonly found on shades, is employed with the roll 27 to permit movement of the sunscreen 15b between its retracted and extended positions.

Each sunscreen 15a,b further includes a rod 29a,b attached to each edge, opposite the edge which is attached to the roll 27. The sunscreens do not extend along the entire length of the rods such that a portion of the rods at the top and bottom thereof are free, i.e. not attached to the respective sunscreens. The rods are able to be retracted through the slot 23 and into the respective housing, along with the sunscreens. Handles 30,31 are removably attached to each rod 29a,b, respectively, using any conventional fastening means. The handles 30,31 are shaped and sized such that they do not fit through the slot 23, thus providing a portion to grasp and pull when extending the sunscreens to the extended positions. The handles 30,31 includes means for connecting the handles together when the sunscreens are in the extended positions, thus retaining the sunscreens in this position and forming a continuous sunscreen sheet over the windshield. The connecting means comprises a tongue 32 formed on the handle 31 which is received by a matching groove 33 (shown in dashed lines) on the handle 30. Thus, by inserting the tongue into the groove, the two handles can be releasably connected together.

Figure 2:
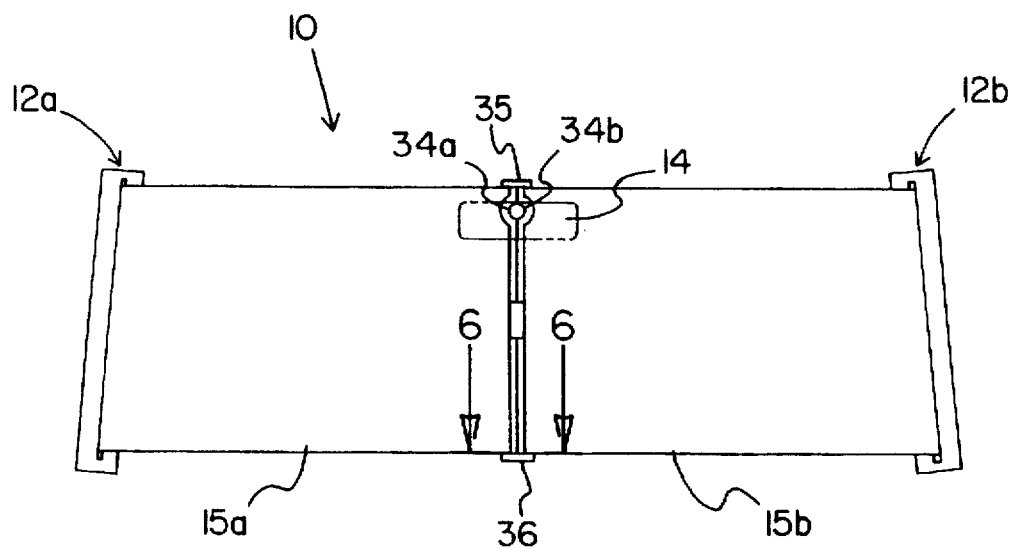
FIG. 2 is a view similar to FIG. 1, but with the sunscreens being extended over the windshield.

In order to accommodate the rear view mirror support post when the sunscreens are in the extended positions and to permit the sunscreens to completely cover the windshield, each of the rods 29a,b includes a semi-circular recess 34a,b therein, with each recess being sized and shaped such that it encompasses about one-half of the circumference of the mirror support post. Therefore, as can be seen in FIG. 2, when the sunscreens are extended, the recesses 34a,b fit together around the mirror support post, thus permitting the rods of the sunscreens to substantially meet so that the entire windshield is covered by the sunscreens with little or no gap between the sunscreens to permit sunlight to enter through the windshield.

Figure 6:
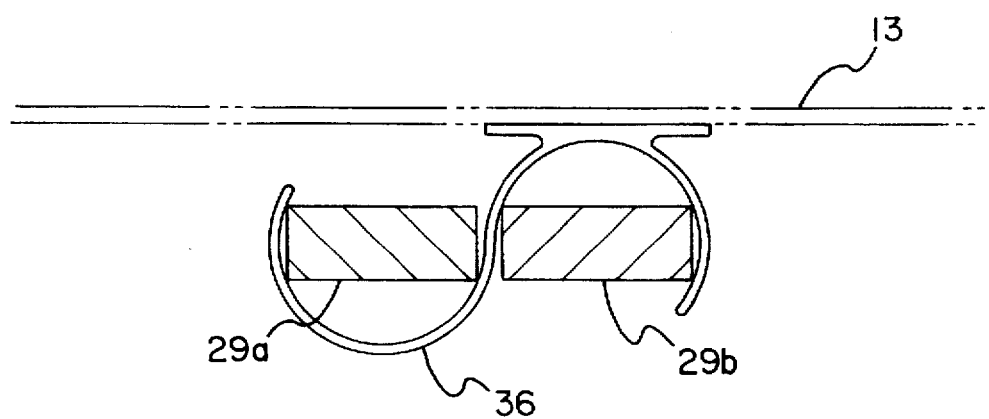
FIG. 6 is a partial cross sectional view taken along line 6—6 of FIG. 2.

A supplemental securement means is further provided so as to help secure the sunscreens in position over the windshield. The supplemental securement means comprises first and second members 35,36 secured to the center of the windshield 13 adjacent the top and bottom edges thereof. As shown in FIG. 6, the second securement member 36 comprises an "S" shaped hook, which is attached to the windshield such that it extends generally perpendicularly therefrom. The bottom free ends of the rods 29a,b simply fit into each hook of the "S" shaped member 36 for securing the bottom ends of the sunscreens and rods in place. The member 35 is similar to the member 36 for securing the top ends of the sunscreens and rods in place. Members 35,36 having shapes other than "S" shapes can be used if desired, and the free portions of the rods could be provided with holes so that the members fit into the holes for securing the sunscreens in place.

In use, the sunscreen assemblies are attached to opposite roof support members of the vehicle, using the clip(s) on the backside of the housings. When driving, or when sunlight is desired, the sunscreens are retracted into the respective housings, so that the windshield is uncovered. When it is desired to cover the windshield, the user simply grasps each of the handles attached to the sunscreens and pulls them towards each other until they meet at the middle of the windshield. The tongue is inserted into the groove thus locking the handles together and retaining the sunscreens in the extended position covering the windshield. If additional securement is desired, the tops and bottoms of the rods are connected to the first and second securement members, thus securing the top and bottoms of the sunscreens in place as well.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sunshade system for covering a windshield of a vehicle, comprising:

a pair of sunshade assemblies for being disposed adjacent opposite ends of the windshield;

each said sunshade assembly including a housing;

said housing comprises a main housing portion;

a sunscreen support roll disposed within the housing;

a sunscreen attached along one edge thereof to the support roll;

a rod attached to an edge of each sunscreen opposite the edge attached to the support roll;

a handle means attached to each said rod;

means for connecting the handle means together so that the sunscreens are secured in position over the windshields;

said main housing portion includes top and bottom mounting brackets therein which support the support roll; and each said mounting bracket includes a plurality of mounting slots therein permitting the angle of the support roll to be changed.

2. The sunshade system of claim 1, wherein each said handle means is removably attached to the respective rod.

3. The sunshade system of claim 1, wherein each said sunshade assembly housing includes mounting means attached thereto for mounting the housing to a roof support member of the vehicle.

4. A sunshade system for covering a windshield of a vehicle, comprising:

a pair of sunshade assemblies for being disposed adjacent opposite ends of the windshield;

each said sunshade assembly including a housing;

a mounting means attached to said housing;

said mounting means comprises a C-shaped mounting clip;

a sunscreen support roll disposed within the housing;

a sunscreen attached along one edge thereof to the support roll;

a rod attached to an edge of each sunscreen opposite the edge attached to the support roll;

a handle means attached to each said rod; and means for connecting the handle means together so that the sunscreens are secured in position over the windshield.

5. The sunshade system of claim 4, wherein the sunscreens are sized such that each sunscreen covers about one-half of the windshield.

6. The sunshade system of claim 4, wherein each said rod includes a semi-circular recess therein, the semi-circular recesses being sized such that each recess encompasses about one-half of a circumference of a rear view mirror support post when the sunscreens are in position over the windshield.

7. The sunshade system of claim 4, wherein said connecting means comprises a tongue on one of the handles and a matching groove on the other handle.

8. The sunshade system of claim 4, further including supplemental securement means for securing the sunscreens in position over the windshield.

9. The sunshade system of claim 8, wherein said supplemental securement means comprises first and second fastening means secured to the windshield centrally along the top and bottom edges thereof, respectively, said first and second fastening means being adapted for engagement with top and bottom portions of each rod, respectively, for securing the sunscreens in position over the windshield.

10. The sunshade system of claim 9, wherein said first and second fastening means comprise "S" shaped hooks.

11. The sunshade system for covering a windshield of a vehicle, comprising:

a pair of sunshade assemblies for being disposed adjacent opposite ends of the windshield;

each said sunshade assembly including a housing;

a sunscreen support roll disposed within the housing;

a sunscreen attached along one edge thereof to the support roll;

a rod attached to an edge of each sunscreen opposite the edge attached to the support roll;

a handle means attached to each said rod;

means for connecting the handle means together so that the sunscreens are secured in position over the windshield; and each said sunshade assembly housing comprises a main housing portion and a housing cover portion removably attached to the main housing portion.

12. The sunshade system of claim 11, wherein said housing cover portion includes a slot therein through which the respective sunscreen extends.

13. The sunshade system of claim 11, wherein said main housing portion includes top and bottom mounting brackets therein which support the support roll.

14. The sunshade system of claim 13, wherein the support roll is supported at an angle relative to a longitudinal axis of the housing.

15. The sunshade system of claim 14, wherein each said mounting bracket includes a plurality of mounting slots therein permitting the angle of the support roll to be changed.

* * * * *